United States Patent
Bachmann et al.

(10) Patent No.: US 12,202,425 B2
(45) Date of Patent: Jan. 21, 2025

(54) COUPLING DEVICE FOR SECURING AN AIRBAG MODULE TO A VEHICLE STEERING WHEEL

(71) Applicant: ZF Automotive Safety Germany GmbH, Aschaffenburg (DE)

(72) Inventors: Stefan Bachmann, Heimbuchenthal (DE); Dominik Schütz, Heimbuchenthal (DE)

(73) Assignee: ZF Automotive Safety Germany GmbH, Aschaffenburg (DE)

( * ) Notice: Subject to any disclaimer, the term of this patent is extended or adjusted under 35 U.S.C. 154(b) by 0 days.

(21) Appl. No.: 17/908,032

(22) PCT Filed: Feb. 18, 2021

(86) PCT No.: PCT/EP2021/053944
§ 371 (c)(1),
(2) Date: Aug. 30, 2022

(87) PCT Pub. No.: WO2021/175600
PCT Pub. Date: Sep. 10, 2021

(65) Prior Publication Data
US 2023/0085537 A1 Mar. 16, 2023

(30) Foreign Application Priority Data
Mar. 5, 2020 (DE) .......................... 202020101209.6

(51) Int. Cl.
*B60R 21/203* (2006.01)
*B60Q 5/00* (2006.01)

(52) U.S. Cl.
CPC .......... *B60R 21/2037* (2013.01); *B60Q 5/003* (2013.01)

(58) Field of Classification Search
CPC .............. B60R 21/203; B60R 21/2035; B60R 21/2037
See application file for complete search history.

(56) References Cited

U.S. PATENT DOCUMENTS 9,365,177 B2 * 6/2016 Bachmann ............ B60R 21/203
10,099,642 B2 * 10/2018 Bachmann ............ F16B 19/004
(Continued)

FOREIGN PATENT DOCUMENTS

DE 4111883 A1 10/1991
DE 202017104817 U1 9/2017
(Continued)

OTHER PUBLICATIONS

International Search Report and Written Opinion for PCT/EP2021/053944 mailed Mar. 19, 2021 (10 pages; with English translation).

*Primary Examiner* — Barry Gooden, Jr.
(74) *Attorney, Agent, or Firm* — Kristin L. Murphy

(57) ABSTRACT

The disclosure relates to a coupling device for securing an airbag module to a steering wheel main body of a vehicle steering wheel. The coupling device comprises: a securing body which has, relative to a steering wheel axis, an axial lower face that faces the steering wheel main body when the vehicle steering wheel is assembled, and an axial upper face that faces the airbag module when the vehicle steering wheel is assembled. An engagement element is disposed on the upper face of the securing body, for engaging with the airbag module. The engagement element is designed so that the airbag module can be coupled to the securing body by an engagement connection in such a manner that it cannot be substantially axially displaced or it can be limitedly axially displaced. An electronic control unit is provided and the securing body at least partly forms a housing of the electronic control unit.

19 Claims, 7 Drawing Sheets

(56) References Cited

U.S. PATENT DOCUMENTS

| | | | |
|---|---|---|---|
| 11,161,472 B2* | 11/2021 | Schütz | B60Q 5/003 |
| 11,370,377 B2* | 6/2022 | Schütz | B60R 21/2037 |
| 11,465,577 B2* | 10/2022 | Bachmann | B60R 21/2037 |
| 11,498,506 B2* | 11/2022 | McMillan | B62D 1/11 |
| 11,667,256 B2* | 6/2023 | Bachmann | B60R 21/2037 |
| | | | 280/731 |
| 11,718,257 B2* | 8/2023 | McMillan | B60R 21/2037 |
| | | | 280/731 |
| 2003/0184062 A1* | 10/2003 | Albers | B60Q 5/003 |
| | | | 280/731 |
| 2004/0089527 A1* | 5/2004 | Rumpf | B60R 21/2037 |
| | | | 200/61.54 |
| 2007/0132218 A1* | 6/2007 | Kim | B60R 21/217 |
| | | | 280/728.2 |
| 2007/0278772 A1 | 12/2007 | Burghardt et al. | |
| 2014/0203539 A1* | 7/2014 | Bachmann | B62D 1/046 |
| | | | 280/728.1 |
| 2017/0066398 A1* | 3/2017 | Bachmann | B60R 21/2037 |
| 2017/0158126 A1* | 6/2017 | Lisseman | B60R 21/2037 |
| 2020/0282940 A1* | 9/2020 | Tessier | B60Q 5/003 |
| 2020/0317123 A1* | 10/2020 | Osterfeld | B60R 16/027 |
| 2021/0229618 A1* | 7/2021 | Schutz | B62D 1/04 |

FOREIGN PATENT DOCUMENTS

| | | |
|---|---|---|
| DE | 102016007421 A1 | 12/2017 |
| DE | 102017204728 A1 | 9/2018 |
| DE | 202018104360 U1 | 10/2019 |

\* cited by examiner ved in the steering wheel, for example. However, this is a problem with regard to the electric connection of the rotatable vehicle steering wheel to the stationary control unit and
COUPLING DEVICE FOR SECURING AN AIRBAG MODULE TO A VEHICLE STEERING WHEEL

CROSS-REFERENCE TO RELATED APPLICATIONS

This application is a national stage of International Application No. PCT/EP2021/053944, filed Feb. 18, 2021, the disclosure of which is incorporated herein by reference in its entirety, and which claimed priority to German Patent Application No. 202020101209.6, filed Mar. 5, 2020, the disclosure of which is incorporated herein by reference in its entirety.

TECHNICAL FIELD

The disclosure relates to a coupling device for securing, specifically for vibratory securing, of an airbag module to a steering wheel main body of a vehicle steering wheel, as well as to a vehicle steering wheel comprising such coupling device.

BACKGROUND

In numerous vehicle steering wheels, vibrations felt to be disturbing by the driver are occurring during idling or in specific speed ranges of the vehicle. Those vibrations are due, inter alia, to the rigid coupling of the steering wheel to the steering column.

It is known to use so-called vibration dampers to avoid the undesired steering wheel vibrations for adjusting the inherent frequency of the total system such that it is within an uncritical range. Currently, for example, the gas generator of an airbag module disposed in the steering wheel is used as counter-vibrating damper weight.

Since the vibration damping improves with an increasing damper weight, in DE 37 10 173 C2 a vehicle steering is described in which the entire airbag module is advantageously utilized as damper weight. Via the shear stiffness of the vibration dampers used, the first inherent frequency of the steering wheel/module system can be adjusted to be so low that it comes to be within a speed range of the vehicle in which high excitation amplitudes do not yet occur (for example at about 120 km/h).

In vibratory airbag modules, the vibration dampers are currently also used to realize a horn function on the vehicle steering wheel, with a horn contact being provided on the airbag module and a corresponding mating contact being provided on the steering wheel main body. Such a vehicle steering wheel is disclosed, for example, in U.S. Pat. No. 8,720,942 B2.

However, it has turned out that in steering wheels of this type, for example, on rough road sections, the vehicle horn may be falsely triggered, or, compared to steering wheels having no vibration damping, larger contacting paths or higher contacting forces are required to trigger the vehicle horn. This results in undesirably large clearances on the vehicle steering wheel and impaired comfort when blowing the vehicle horn.

Further, in modern vehicle steering wheels, sensors such as electric actuation and display devices are increasingly integrated, wherein the data and signal processing thereof is performed in an electronic control unit that is disposed outside the steering wheel, for example. However, this is a problem with regard to the electric connection of the rotatable vehicle steering wheel to the stationary control unit and requires complicated wiring. As an alternative, the electronic control unit for data and signal processing may also be accommodated in the rotatable vehicle steering wheel. This results in an undesirably voluminous steering wheel, however, which may impair the visibility and operation friendliness of switches and instruments in the adjacent area of the dashboard for the driver.

SUMMARY

What is needed is to provide a compact vehicle steering wheel having a simple structural design with an integrated electronic control unit in which both a vibration damping and a horn function are provided, said horn function having an as short actuating path as possible and an as low actuating force as possible.

In accordance with the disclosure, a coupling device for securing, for example, vibratory securing, of a prefabricated airbag module to a steering wheel main body of a vehicle steering wheel is disclosed. The coupling device comprises a securing body which has, relative to a steering wheel axis, an axial lower face that faces a steering wheel main body when the vehicle steering wheel is assembled and an opposite axial upper face that faces the airbag module when the vehicle steering wheel is assembled, as well as an engagement element which is disposed on the upper face of the securing body for engaging with the airbag module. The engagement element is designed so that the airbag module can be coupled to the securing body by an engagement connection in such a manner that it cannot be substantially axially displaced or it can be limitedly axially displaced. The coupling device includes an electronic control unit. The securing body at least partly forms a housing of the electronic control unit. By integrating the electronic control unit into the coupling device, the securing body adopts, apart from its actual function as an interface between the steering wheel main body and the airbag module, an additional function as a housing component of the electronic control unit. Accordingly, at least one housing component of the control unit can be eliminated, which allows, on the one hand, to realize a more compact design and, on the other hand, to reduce the number of the individual components and the assembling effort. In a conventional vehicle steering wheel equipped with an electronic control unit, however, the control unit is usually configured as a separate assembly group with its own housing and is installed between a hub area of the steering wheel main body and a plate-shaped securing body of the coupling device.

According to one exemplary arrangement of the coupling device, on the axial lower face of the securing body a contact surface for a damping element for vibratory coupling of the securing body to the steering wheel main body is provided.

With respect to the securing body of the coupling device, on a side of the steering wheel main body, the vibration is damped (and in one exemplary arrangement, transversely to the steering wheel axis), whereas a horn function (in direction of the steering wheel axis) is realized on the module side. In this way, the vibration damping function and the horn function are separated from each other in a simple manner so that vibration excitations of the steering column and of the steering wheel main body tightly connected thereto (for example on rough road sections) are damped initially between the steering wheel main body and the securing body and do not directly affect the module-side horn function anymore. A vibratory coupling of the securing body to the steering wheel main body by the damping element is to be understood, within the scope of the present application, so that the damping element enables damped vibration between the securing body and the steering wheel main body at least transversely to the steering wheel axis, and in some exemplary arrangements also in the direction of the steering wheel axis. The maximum amplitude of a possible vibration in the direction of the steering wheel axis is smaller than an axial actuation path for triggering a vehicle horn.

In one exemplary arranaement, the securing body of the coupling device is a securing plate extending substantially perpendicularly to the steering wheel axis and having plural engagement elements. In one exemplary arrangement, the engagement elements are formed integrally with the securing plate. Furthermore, the engagement elements may have an identical distance from the steering wheel axis and may be evenly spread in the circumferential direction. Thus, simple and quick assembly of the coupling device as well as a stable support of the airbag module are resulting. As an alternative, it is also conceivable, as a matter of course, that plural separate securing bodies each having an engagement element are provided for vibratory securing of the airbag module to the steering wheel main body.

A damping element can be associated with each engagement element, wherein the engagement elements and associated damping elements are respectively disposed axially one behind the other.

In one exemplary arrangement, the electronic control unit comprises an equipped printed circuit board and a housing part that is attached to the securing body and, together with the securing body, encloses the printed circuit board. The printed circuit board in this case includes plural electronic components and in one exemplary arrangement, is fixed to the securing body. Alternatively, or additionally, the equipped printed circuit board may also be secured to the housing part. The housing part of the electronic control unit is tightly connected to the securing body, for example screwed, adhesively bonded orinjection-molded to the securing body.

According to one arrangement of the coupling device, on the axial upper face of the securing body a horn contact or an actuating element for triggering a horn signal in the event of contact between the horn contact and a mating contact disposed on the airbag module is arranged. The engagement element is configured such that the airbag module can be coupled to the securing body by an engagement connection in such a manner that it can be limitedly axially displaced. In other words, in this case the entire airbag module is axially displaced to blow the vehicle horn, wherein both the horn contact and the mating contact are formed on vibratingly supported components of the vehicle steering wheel.

According to another exemplary arrangement, the coupling device includes a damping element that abuts on the contact surface on the axial lower face of the securing body and vibratingly couples the securing body to the steering wheel main body so that, with respect to the securing body, vibration is damped on the side of the steering wheel main body, whereas a horn function is realized on the side of the airbag module. The vibratory coupling allows the securing body and the steering wheel main body to be movable relative to each other at least transversely to the steering wheel axis, for example wherein the damping element is preassembled to the axial lower face of the securing body. The damping element comprises a vibration-damping material as well as optionally stop elements and/or mounting sleeves which are adjacent to the vibration-damping material.

In this exemplary arrangement, the electronic control unit has a horn contact. Since the horn contact is located directly on the printed circuit board, any effort for connecting the horn contact to the electronic control unit and, resp., the printed circuit board is thus omitted.

In one exemplary arrangement, the horn contact extends through the housing of the electronic control unit, in particular through the securing body of the housing, wherein the horn contact in the assembled state of the vehicle steering wheel is axially adjacent to a mating contact of the airbag module. This allows to realize, with little constructional expenditure, a vehicle horn in which advantageously both the horn contact and the mating contact are configured on vibratingly supported components of the vehicle steering wheel.

The damping element may extend, in this exemplary arrangement, through an opening of the securing body.

Further, the damping element can comprise a ring-shaped vibration-damping material having a radial shoulder, wherein an edge of the securing body opening forms a contact surface and acts on the radial shoulder of the vibration-damping material.

In one exemplary arrangement, the radial shoulder is configured as a groove in the vibration-damping material, the edge of the securing body opening engaging at least in portions in the groove. This allows for quick and simple axial positioning and fixation of the damping element on the securing body.

Incidentally, an assembly group may be provided, comprising a steering wheel main body, an afore-described coupling device and a screw for assembling the coupling device to the steering wheel main body, which screw extends through the ring-shaped vibration-damping material, the vibration-damping material abutting with an axial end face at least in portions on a screw head of the screw and/or with an opposite axial end face at least in portions on the steering wheel main body. The delimitation of the receiving space for the vibration-damping material by components that are present anyway, such as the securing body, the screw head and/or the steering wheel main body, is particularly advantageous, because separate mounting sleeves and/or stop elements can be dispensed with. Ideally, the damping element is then formed exclusively by the vibration-damping material.

Further, an assembly group is conceivable comprising a steering wheel main body, an above-described coupling device and a damping element for vibratory coupling of the securing body to the steering wheel main body, the damping element being disposed on the axial lower face of the securing body and being preassembled together with the securing body on the steering wheel main body.

Moreover, also an assembly group is conceivable comprising a prefabricated airbag module and an above-described coupling device, wherein the airbag module, specifically a module bottom of the airbag module, includes a mating contact axially adjacent to the horn contact, and wherein the airbag module is supported to be axially movable relative to the securing body for triggering a horn signal.

Ultimately, yet another assembly group is conceivable, comprising a prefabricated airbag module as well as an above-described coupling device, wherein the airbag module includes a (manually operable) module cover comprising a horn contact as well as another module component comprising a mating contact axially adjacent to the horn contact, wherein the module cover is supported to be axially movable relative to the further module component for triggering a horn signal. In other words, here the horn function is realized "inside" the airbag module, wherein even in this configuration variant the horn contact and the mating contact are formed on vibratingly supported components of the vehicle steering wheel.

Finally, a vehicle steering wheel of a vehicle is disclosed, comprising a steering wheel main body, a prefabricated airbag module, an above-described coupling device and a damping element for vibratory coupling of the securing body to the steering wheel main body. The vehicle steering wheel including a horn contact and a mating contact axially adjacent to the horn contact, and both the horn contact and the mating contact being formed on vibratingly supported components of the vehicle steering wheel. In one exemplary arrangement, the coupling device and the damping element form a damper unit that is preassembled on the steering wheel main body. In this way, the vehicle steering wheel can be assembled with particularly little effort. The prefabricated damper unit is initially connected, for example, screwed, to the steering wheel main body, whereupon the equally prefabricated airbag module is axially supplied until it engages with the damper unit and is thus secured to the steering wheel main body.

In a structurally particularly simple arrangement of the vehicle steering wheel, the airbag module is secured to the steering wheel main body exclusively by the engagement connection with the coupling device.

However, as an alternative it is also imaginable to provide an additional (engagement) connection between the airbag module and the steering wheel main body which, while allowing limited relative movement during normal driving operation of the vehicle, ensures, however, that the airbag module does not completely disengage from the steering wheel main body when the airbag module is activated. Consequently, the airbag module in this exemplary arrangement is secured to the steering wheel main body by the coupling device, wherein moreover another connection between the airbag module and the steering wheel main body independent of the coupling device is provided. This is of advantage, because the connections to the coupling device in this case do not have to be designed for the extreme loads occurring, for example, when the airbag module is activated.

BRIEF DESCRIPTION OF DRAWINGS

Further features and advantages of the disclosure will be evident from the following description of exemplary arrangements with reference to the drawings, wherein.

DETAILED DESCRIPTION

Figure 1:
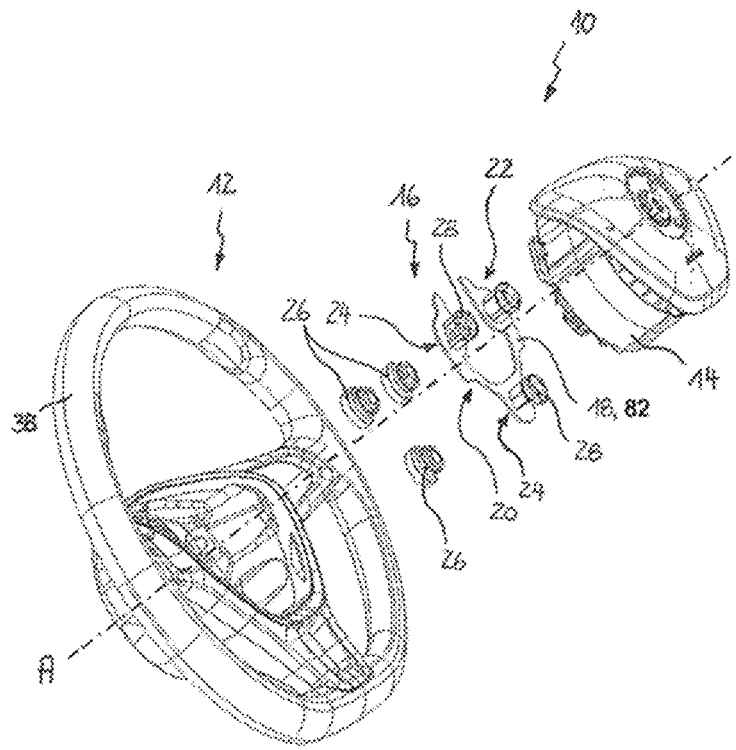
FIG. 1 shows a perspective exploded view of a vehicle steering wheel according to the disclosure comprising a coupling device according to the disclosure as set forth in an exemplary arrangement.

FIG. 1 illustrates a vehicle steering wheel 10 comprising a steering wheel main body 12, a prefabricated airbag module 14 and a coupling device 16 for vibratory securing of the airbag module 14 to the steering wheel main body 12.

The coupling device 16 comprises a securing body 18 which has, relative to a steering wheel axis A, an axial lower face 20 that faces the steering wheel main body 12 when the vehicle steering wheel 10 is assembled, as well as an opposite axial upper face 22 that faces the airbag module 14 when the vehicle steering wheel 10 is assembled. On the axial lower side 20 of the securing body 18, a contact surface 24 for a damping element 26 is provided for vibratory coupling of the securing body 18 to the steering wheel main body 12, whereas on the axial upper face 22 at least one engagement element 28 is arranged for engagement with the airbag module 14.

The engagement element 28 is configured so that the airbag module 14 can be coupled to the securing body 18 by an engagement connection in such a manner that it cannot be substantially axially displaced or it can be limitedly axially displaced.

According to the exemplary arrangement of FIG. 1, the securing body 18 is a securing plate extending perpendicularly to the steering wheel axis A and having three engagement elements 28. In this case, the securing body 18 is a metal part configured integrally with the engagement elements 28, wherein the engagement elements 28 have an identical distance from the steering wheel axis A and are arranged to be evenly spread in the circumferential direction.

Alternative configuration variants are also imaginable, however, in which the securing body 18 is made of robust plastic material.

Figure 13:
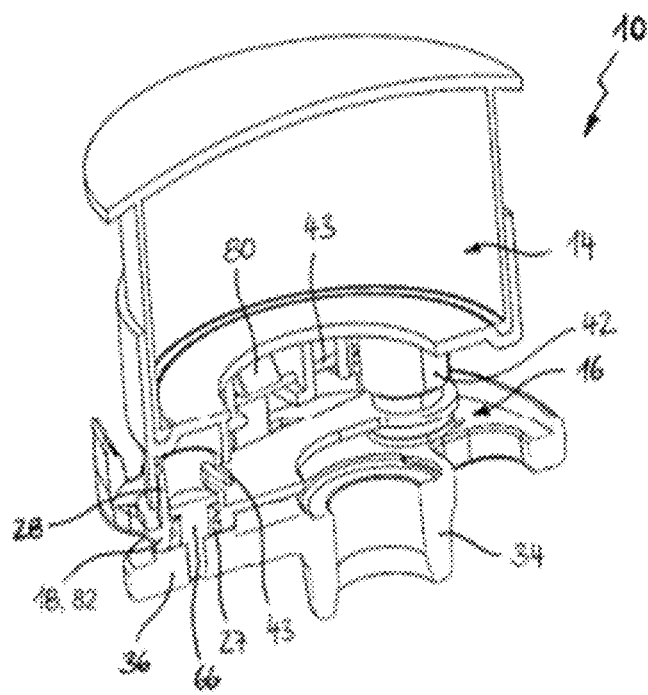
FIG. 13 shows a sectional view of a vehicle steering wheel according to the disclosure comprising an assembly group as set forth in FIG. 8 and an installed airbag module.
Figure 14:
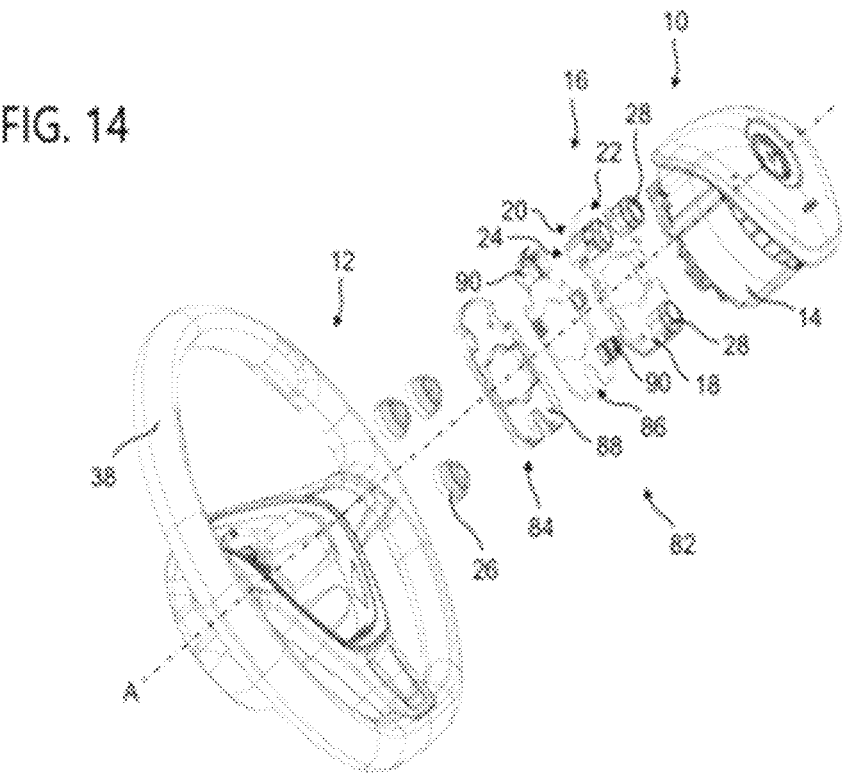
FIG. 14 shows a perspective exploded view of a vehicle steering wheel according to the disclosure comprising a coupling device according to the disclosure.
Figure 15:
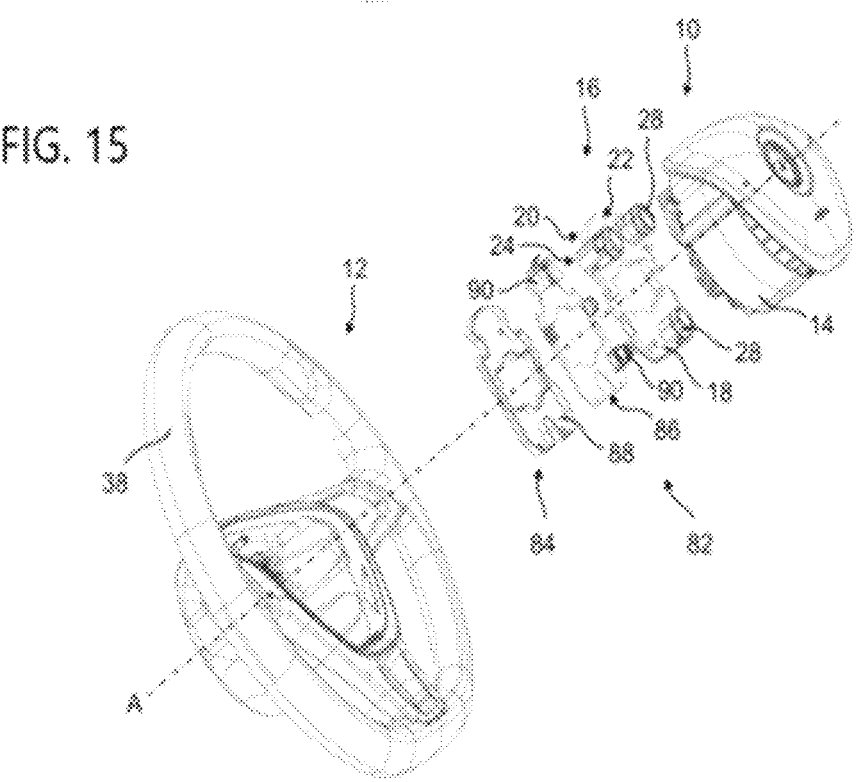
FIG. 15 shows a perspective exploded view of a vehicle steering wheel according to the disclosure comprising a coupling device according to the disclosure as set forth in a further exemplary arrangement.

Even if in the exemplary arrangements according to FIGS. 1 to 13 merely one securing body 18 is graphically shown, said securing body 18 is intended, within the scope of the present application, to symbolize always an electronic control unit 82 having an integrated securing body 18, as shown in detail in FIGS. 14 and 15.

The coupling device 16 includes, in the shown exemplary arrangement, three damping elements 26 each of which abuts on a contact surface 24 on the axial lower side 20 of the securing plate.

According to FIG. 1, a damping element 26 is associated with each engagement element 28, the engagement elements 28 and the associated damping elements 26 being disposed axially one behind the other.

Figure 2:
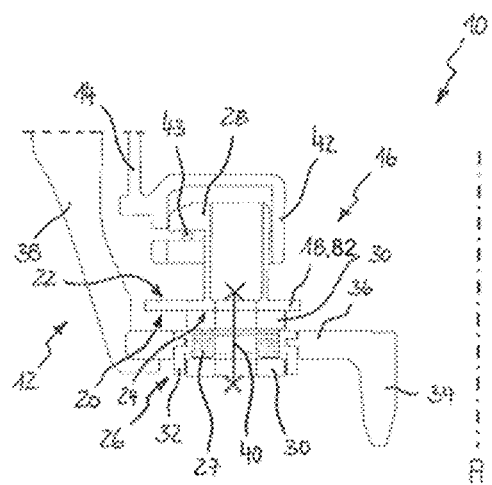
FIG. 2 shows a schematic detail section across the steering wheel according to FIG. 1 in the area of an engagement element of the coupling device.

FIG. 2 illustrates a detail section across the vehicle steering wheel 10 of FIG. 1 in the area of a damping element 26 and its associated engagement element 28.

The damping element 26 in this case comprises a vibration-damping material 27, such as an elastomer, as well as two stop elements 30 and a mounting sleeve 32 each of which is adjacent to the vibration-damping material 27. The stop elements 30 are axially disposed on both sides of the vibration-damping material 27, while the mounting sleeve 32 extends axially between the stop elements 30.

The steering wheel main body 12 generally comprises a steering wheel skeleton including a steering wheel rim, at least one spoke as well as a hub 34 and a hub plate 36. Moreover, the steering wheel main body 12 usually comprises a foam wrapping 38, such as of polyurethane, which at least partially surrounds the steering wheel skeleton.

The damping element 26 is secured, according to FIG. 2, via the mounting sleeve 32 to the steering wheel skeleton, the mounting sleeve 32 and the hub plate 36 forming a bayonet lock, for example.

Further, it becomes clear that the securing body 18 with the integrally formed engagement element 28 is connected to the damping element 26 via a screw 40 and is connected to the steering wheel skeleton via the damping element 26.

The vibration-damping material 27 can be connected already in advance, such as by vulcanizing, to the mounting sleeve 32 and the stop elements 30 to form with the latter the prefabricated damping element 26. Then the mounting sleeve 32 of each individual damping element 26 is secured, in the manner of a bayonet lock, to the steering wheel main body 12, precisely to the hub plate 36 of the steering wheel main body 12. Finally, the securing body 18 is inserted with its integrally formed engagement elements 28 and is connected to the individual damping elements 26 by the screws 40.

As will be exemplified below by FIG. 4, as a matter of course also alternatives for securing the coupling device 16 to the steering wheel main body 12 are imaginable, however.

In any case, an assembly group comprising the steering wheel main body 12, the afore-described coupling device 16 and at least one damping element 26 for vibratory coupling of the securing body 18 to the steering wheel main body 12 is resulting in this way, wherein the at least one damping element 26 is disposed on the axial lower face 20 of the securing body 18 and is preassembled together with the securing body 18 on the steering wheel main body 12.

The engagement elements 28 of the coupling device 16 are respective rigid engagement hooks, according to FIGS. 1 and 2, which immerse into module bushes 42 when the prefabricated airbag module 14 is axially attached and engage with a spring wire 43 mounted on the airbag module 14.

Figure 3:
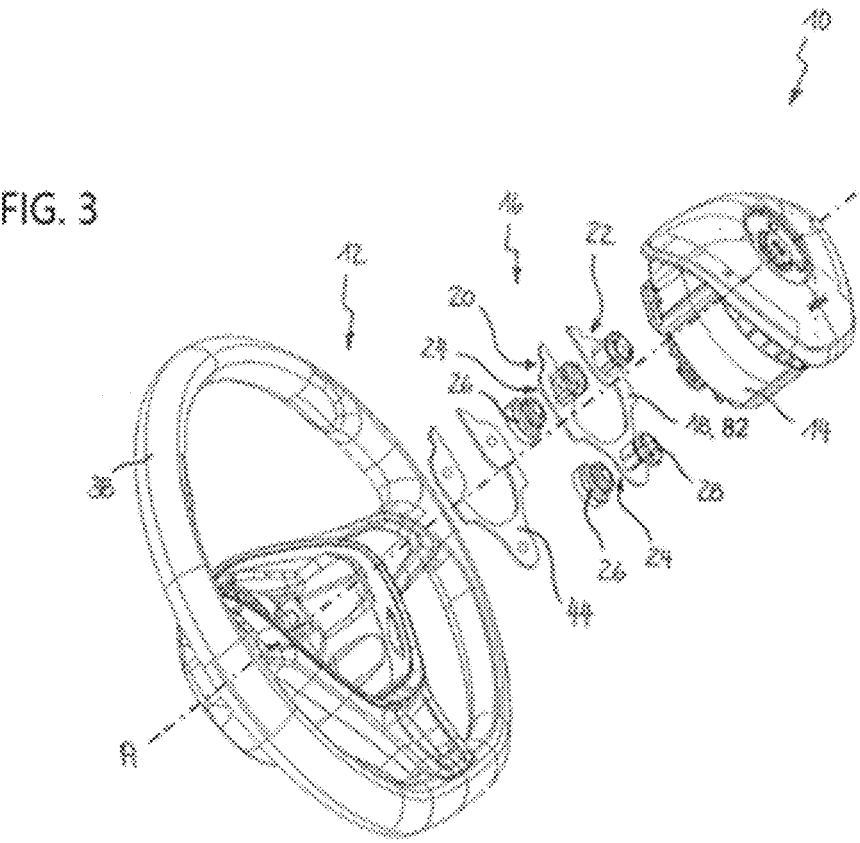
FIG. 3 shows a perspective exploded view of a vehicle steering wheel according to the disclosure comprising a coupling device according to the disclosure as set forth in another exemplary arrangement.

FIG. 3 illustrates a vehicle steering wheel 10 which differs from the steering wheel design according to FIG. 1 merely by a different exemplary arrangement of the coupling device 16. In order to avoid repetitions, therefore the foregoing description is generally referred to and, in the following, primarily differences will be discussed.

As compared to the exemplary arrangement according to FIG. 1, the coupling device 16 according to FIG. 3 shows a different securing to the steering wheel main body 12 which is of particular advantage in view of the mounting effort. Instead of the stop elements 30 and the mounting sleeves 32, the coupling device 16 includes a base plate 44 for installing the securing body 18 on the steering wheel main body 12.

The vibration-damping material 27 in this case constitutes the damping element 26 and can be connected, for example by vulcanizing, already in advance to the securing body 18 and the base plate 44 so that the damping element 26 is part of the prefabricated coupling device 16.

Figure 4:
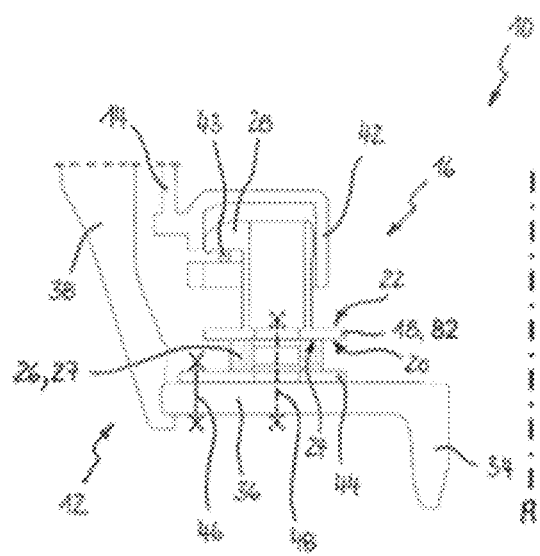
FIG. 4 shows a schematic detail section across the steering wheel according to FIG. 3 in the area of an engagement element of the coupling device.

It becomes clear by the detail section according to FIG. 4 that the base plate 44 of the coupling device 16 then has to be secured only to the steering wheel main body 1, wherein the base plate 44 in the present exemplary arrangement is concretely screwed with the hub plate 36 of the steering wheel main body 12 by a screw 46.

For further reduction of the mounting effort for the coupling device 16, alternatively or additionally to the screwed connection it is also imaginable to foam at least the edge of the base plate 44 into the foam wrap 38 and thus to secure the same to the steering wheel main body 12.

In order to prevent the airbag module 14, when it is activated, from completely disengaging from the steering wheel main body 12, directly on the steering wheel main body 12 tether elements may be provided which are spaced apart from the airbag module 14 during normal driving operation and act directly on the airbag module 14 and retain the module 14 only when the module is activated. Said tether elements are, for example, catch hooks or engagement hooks 80 formed integrally with the steering wheel skeleton of the steering wheel main body 12 (see FIG. 12).

According to a specific variant of the vehicle steering wheel 10, tether elements of this type are not provided. Then the airbag module 14 is secured to the steering wheel main body 12 exclusively via the coupling device 16. In order to fix the engagement element 28 of the coupling device 16 particularly tightly and reliably to the steering wheel main body 12 in this case, alternatively or additionally to the screw 46, a screw 48 indicated as a broken line in FIG. 4 is provided.

As regards a horn function of the steering wheel 10, it is particularly advantageous when the vehicle steering wheel 10 has a horn contact 50 as well as a mating contact 52 axially adjacent to the horn contact 50, wherein both the horn contact 50 and the mating contact 52 are formed on vibratingly supported components of the vehicle steering wheel 10.

Vibratingly supported components in this context are, for example, the securing body 18 of the coupling device 16 as well as the airbag module 14 with all of its module parts.

Figure 5:
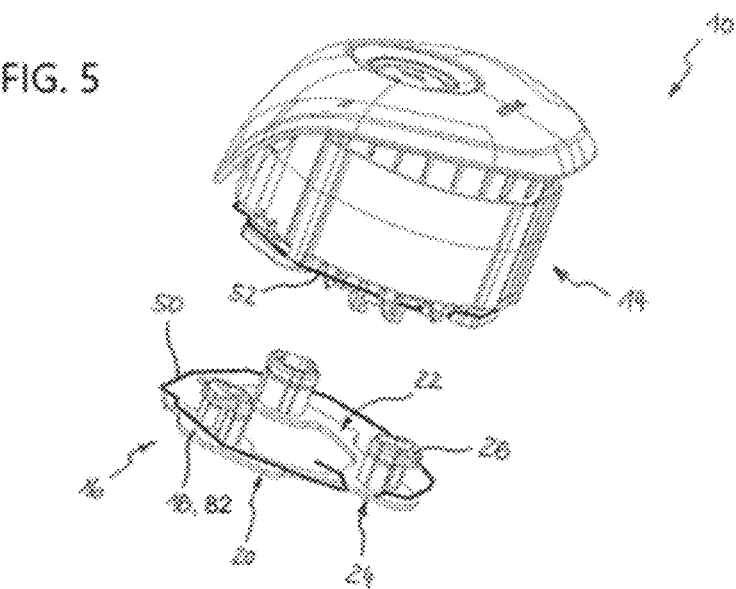
FIG. 5 shows a perspective view of an assembly group according to the disclosure for a vehicle steering wheel comprising a coupling device according to the disclosure as set forth in one exemplary arrangement.
Figure 6:
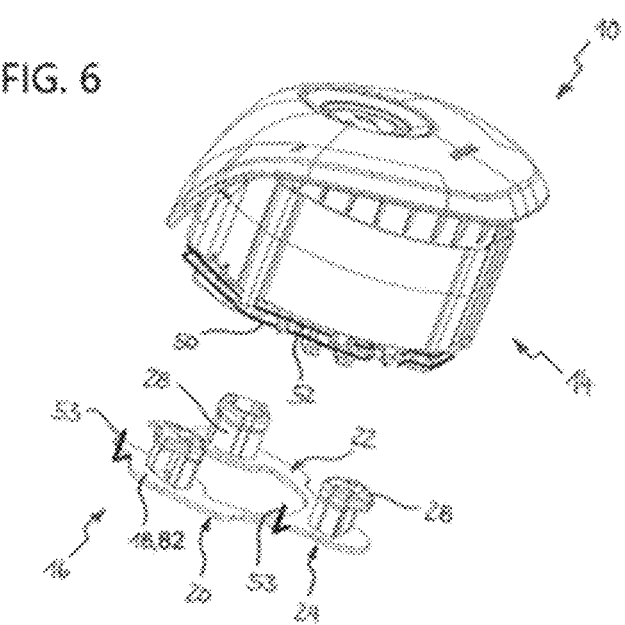
FIG. 6 shows a perspective view of an assembly group according to the disclosure for a vehicle steering wheel comprising a coupling device according to the disclosure as set forth in another exemplary arrangement.
Figure 7:
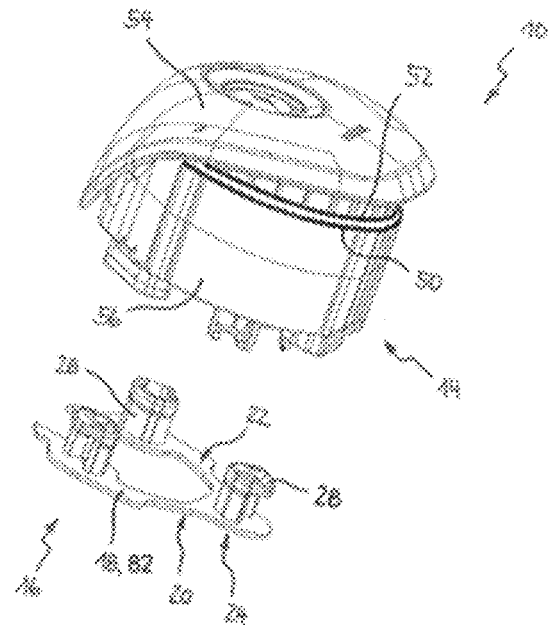
FIG. 7 shows a perspective view of an assembly group according to the disclosure for a vehicle steering wheel comprising a coupling device according to the disclosure as set forth in yet another exemplary arrangement.

In FIGS. 5 to 7, various options to realize such a horn function on the vehicle steering wheel 10 are exemplified.

FIG. 5 shows an assembly group for the vehicle steering wheel 10, comprising a prefabricated airbag module 14 and a coupling device 16 which has a horn contact 50 for triggering a horn signal on the upper face 22 of the securing body 18.

The airbag module 14 includes, axially adjacent to the horn contact 50, a mating contact 52, wherein the (entire) airbag module 14 is supported to be axially movable relative to the securing body 18 for triggering the horn signal. In other words, the prefabricated airbag module 14 is thus coupled to the securing body 18 in such a manner that it can be limitedly axially displaced via the engagement connection with the engagement elements 28 of the coupling device 16 when the vehicle steering wheel 10 is assembled.

FIG. 6 illustrates another assembly group for the vehicle steering wheel 10 which differs from the exemplary arrangement according to FIG. 5 only in that the airbag module 14 includes both the horn contact 50 and the mating contact 52 which is axially spaced apart from the horn contact 50. The vibratingly supported securing body 18 includes, axially adjacent to the horn contact 50, at least one axially projecting actuating element 53, in the shown variant two hook-shaped projections being provided as actuating elements 53. For actuating the horn, then the (entire) airbag module 14 is moved axially toward the securing body 18 against a spring force, wherein the horn contact 50 is deformed or displaced by the at least one actuating element 53 in the direction of the mating contact 52 until the desired horn signal is sounding when the contacts are touched.

FIG. 7 finally shows another exemplary arrangement of the assembly group for the vehicle steering wheel 10, comprising a prefabricated airbag module 14 and a coupling device 16, the horn function being integrated in the airbag module 14. The prefabricated airbag module 14 in this case includes a module cover 54 with the horn contact 50 as well as another module component 56 with the mating contact 52 axially adjacent to the horn contact 50, the module cover 54 being supported to be axially movable relative to the further module component 56 for triggering the horn signal.

As compared to the configuration arrangements according to FIGS. 5 and 6, consequently, according to FIG. 7, the horn is not actuated by displacing the entire airbag module 14 but by a relative movement between the module cover 54 and the further module component 56, such as a module housing.

All configuration arrangements have in common, however, that all components required for actuating the horn, such as horn contacts 50, mating contacts 52 and/or actuating elements 53 are vibratingly supported on the steering wheel main body 12. In a vehicle steering wheel 10 with vibration damping, all of the components required for actuating the horn are, in other words, part of the damper weight of the steering wheel vibration damper.

This is also applicable to the further exemplary arrangement of the coupling device 16 shown in FIGS. 8 to 13 in which the damping element 26 extends through an opening 58 of the securing body 18.

The damping element 26 in the present exemplary arrangement is made of the vibration-damping material 27 which is ring-shaped and externally has a radial shoulder. The securing body opening 58 has an opening edge with radially inwardly protruding projections 60, 62 which form the contact surface 24 for the damping element 26 and act on the radial shoulder of the vibration-damping material 27.

Figure 11:
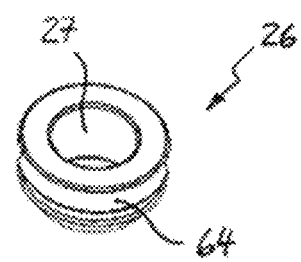
FIG. 11 shows a perspective bottom view of a damping element for the coupling device according to the disclosure as set forth in FIG. 10.

The radial shoulder in the vibration-damping material 27 is configured, according to FIG. 11, as a peripheral groove 64, wherein the opening edge, precisely the projections 60 of the opening edge, engage in the groove 64. This allows the elastic ring of vibration-damping material 27 to be knotted quickly and easily into the opening 58 so that the damping element 26 is axially positioned and fixed on the securing body 18 with minimum effort. Each projection 60 of the securing body 18 has an axial lower face 20 facing the steering wheel main body 12 and forms a contact surface 24 for the damping element 26 which corresponds, in the present case, to the ring-shaped vibration-damping material 27.

Figure 8:
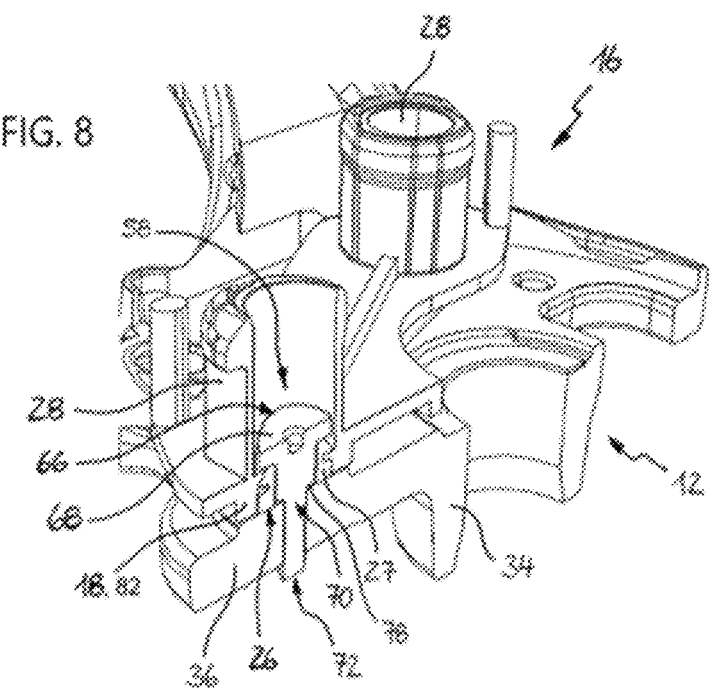
FIG. 8 shows a perspective section view of an assembly group according to the disclosure for a vehicle steering wheel comprising a coupling device according to the disclosure as set forth in yet another exemplary arrangement.
Figure 9:
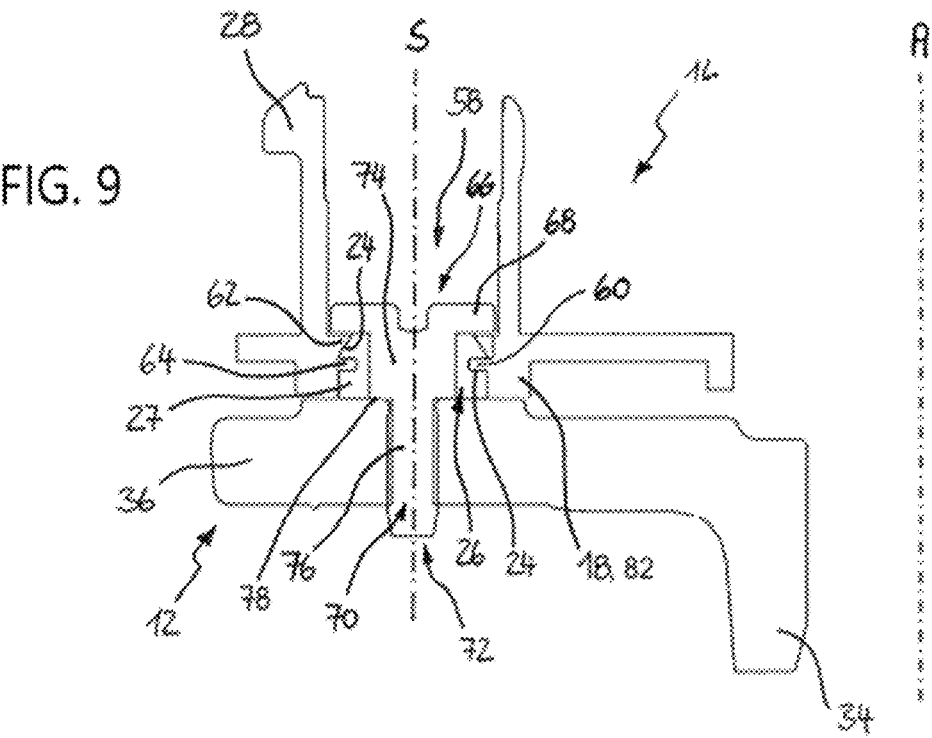
FIG. 9 shows a detail section across the assembly group according to FIG. 8 in the area of a securing body of the coupling device according to the disclosure.
Figure 10:
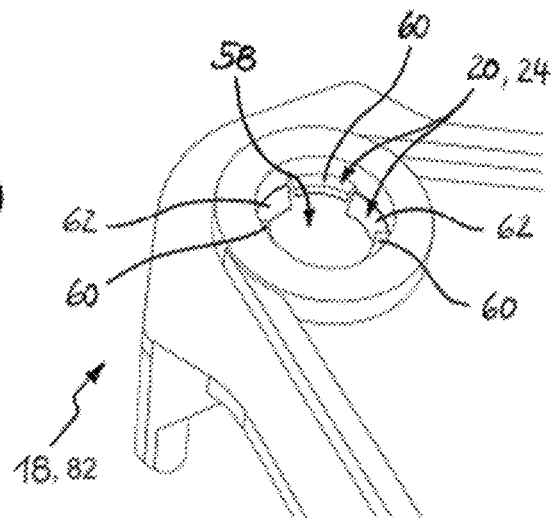
FIG. 10 shows a perspective bottom view of the coupling device according to the disclosure as set forth in FIG. 9 in the area of the securing body.

FIGS. 8 and 9 illustrate an assembly group comprising a steering wheel main body 12, a coupling device 16 and a screw 66 for mounting the coupling device 16 on the steering wheel main body 12, the screw 66 extending through the ring-shaped vibration-damping material 27.

With respect to a screw axis S, the screw 66 extends from a screw head 68 in the axial direction via a screw shank 70 to a free shank end 72. The screw shank 70 is stepped having a spacer portion 74 adjacent to the screw head 68 and a threaded portion 76 adjacent to the spacer portion 74 toward the free shank end 72, the threaded portion 76 adjacent to the spacer portion 74 toward the shank end 72, the threaded portion 76 being separated from the spacer portion 74 by a step 78. The threaded portion 76 has a smaller shank diameter than the spacer portion 74 and is screwed into the hub plate 36 of the steering wheel main body 12, until the step 78 abuts on the hub plate 36 and prevents further screwing in.

The engagement element 28 extends in the axial direction from the securing body 18 to a free end and substantially has a hollow-cylindrical design, with an engagement projection being integrally formed on the free end. An outer diameter of the screw head 68 is somewhat smaller than an inner diameter of the engagement element 28 so that the screw 66 can be inserted into the engagement element 28 and extends through the opening 58 of the securing body 18 into the hub plate 36. Said screwing of the securing body 18 in the area of the engagement element 28 contributes to a particularly compact design of the coupling device 16.

According to FIG. 9, an axial dimension of the spacer portion 74 of the screw 66 is somewhat larger than an axial dimension of the securing body 18 in the area of the damping element 26 so that a certain movement of the securing body 18 relative to the steering wheel main body 12 is possible for vibration damping.

An axial dimension of the damping element 26 is at least as large as the axial dimension of the spacer portion 74 so that the vibration-damping material 27 is axially positioned as well as preferably slightly compressed when the screw 66 is turned in.

The groove 64 in the vibration-damping material 27 is disposed so that the securing body 18 is held, in a non-excited idle position of the vehicle steering wheel 10, via its projections 60 engaging in the groove 64 axially spaced apart from the screw head 68 and the hub plate 36, in particular substantially axially in the middle between the screw head 68 and the hub plate 36.

Just as the projections 60, also the projections 62 of the securing body 18 axially adjacent to the screw head 68 include axial lower faces 20 which face the steering wheel main body 12 and each of which forms a contact surface 24 for the damping element 26. However, the projections 60 primarily act as stops of the securing body 18 on the screw head 68 to define a maximum relative movement between the securing body 18 and the steering wheel main body 12.

The vibration-damping material 27 abuts, with an axial end face, at least in portions on the screw head 68 of the screw 66 and, with an opposite axial end face, at least in portions on the steering wheel main body 12.

Thus, a holding space for the vibration-damping material 27 is thus defined in the axial direction by the screw head 68 and the steering wheel main body 12 and in the radial direction by the spacer portion 74 of the screw shank 70 and the securing body 18. Therefore, advantageously separate stop elements 30 and mounting sleeves 32 (as shown in FIG. 2, for example) can be dispensed with.

If extremely high forces, as they occur when the airbag module 14 is activated, for example, cannot be transferred by the connection between the airbag module 14 and the coupling device 16 and/or by the connection between the coupling device 16 and the steering wheel main body 12, it is imaginable that the airbag module 14 is secured to the steering wheel main body 12 not only by the coupling device 16, but that additionally a further connection is provided between the airbag module 14 and the steering wheel main body 12 which is independent of the coupling device 16.

Figure 12:
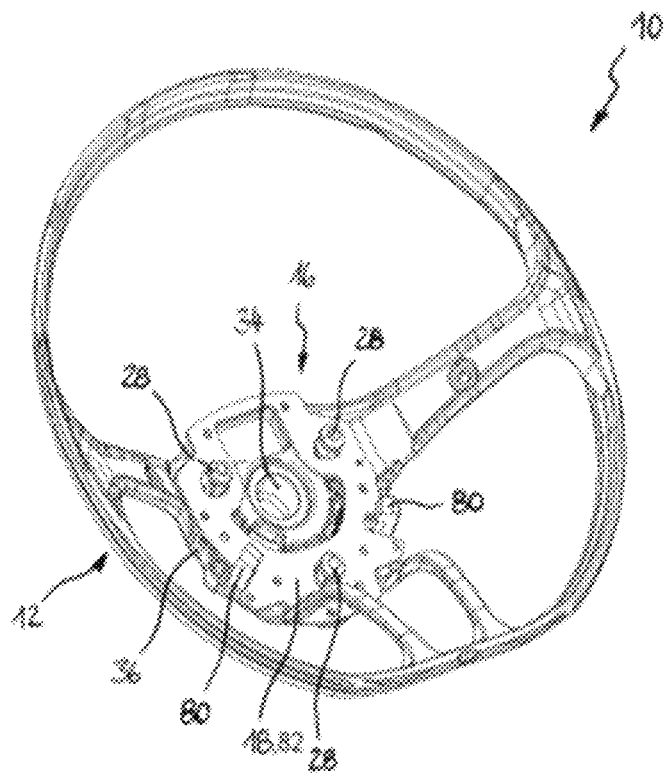
FIG. 12 shows a perspective view of a vehicle steering wheel comprising a coupling device according to the disclosure.

This is illustrated, for example, in a vehicle steering wheel 10 according to FIG. 12. In the shown steering wheel configuration, a coupling device 16 and a steering wheel main body 12 are provided, wherein a securing body 18 of the coupling device 16 configured as a securing plate is vibratingly connected to the steering wheel main body 12 and includes engagement elements 28 for engaging with the airbag module 14. Furthermore, tether elements which, during normal driving operation, are spaced apart from the airbag module 14 and act directly on and withhold the airbag module 14 only when the module is activated are provided on the steering wheel main body 12. According to FIG. 12, said tether elements are engagement hooks 80 formed integrally with the steering wheel skeleton of the steering wheel main body 12.

FIG. 13 illustrates the vehicle steering wheel 10 according to FIG. 12 comprising a coupling device 16 according to FIG. 9 and a mounted airbag module 14. It becomes clear that the spring wire 43 tightly connected to the airbag module 14 engages both in the engagement elements 28 of the coupling device 16 and in the engagement hooks 80 of the steering wheel main body 12.

FIG. 14 illustrates the vehicle steering wheel 10 according to FIG. 1, wherein the coupling device 16 is shown in greater detail. It becomes clear that the coupling device 16 comprises an electronic control unit 82, the securing body 18 forming at least partly a housing 84 of the electronic control unit 82. In other words, the securing body 18 is integrated in the electronic control unit 82, more precisely in the housing 84 of the electronic control unit 82.

The electronic control unit 82 comprises, according to FIG. 14, an equipped printed circuit board 86 and a housing part 88 which is attached to the securing body 18 and, together with the securing body 18, encloses the printed circuit board 86. In one exemplary arrangement, the printed circuit board 86 includes plural electronic components 90 and is fixed to the securing body 18 and/or to the housing part 88.

The housing part 88 of the electronic control unit 82 is tightly connected to the securing body 18, such as screwed, adhesively bonded with the securing body 18 or injection-molded to the securing body 18.

FIG. 15 illustrates a configuration variant of the vehicle steering wheel 10 comprising a coupling device 16 in which the securing body 18 is mounted tightly rather than vibratingly on the steering wheel body 12.

In this case, consequently the coupling device 16 does not comprise a damping element 26 which abuts against the contact surface 24 on the axial lower face 20 of the securing body 18 and vibratingly couples the securing body 18 to the steering wheel main body 12.

Even in vehicle steering wheels 10 of this type without vibration damping, a particularly advantageous compact design results when the securing body 18 is integrated in the electronic control unit 82 and at least partly forms the housing 84 of the electronic control unit 82.

The invention claimed is:

1. A coupling device for securing an airbag module to a steering wheel main body of a vehicle steering wheel, comprising
    a securing body which has, relative to a steering wheel axis, an axial lower face that faces the steering wheel main body when the vehicle steering wheel is assembled, and an opposite axial upper face that faces the airbag module when the vehicle steering wheel is assembled, and
    an engagement element which is disposed on the upper face of the securing body for engaging with the airbag module,
    wherein the engagement element is designed so that the airbag module can be coupled to the securing body by an engagement connection in such a manner that the airbag module cannot be substantially axially displaced or the airbag module can be limitedly axially displaced,
    wherein the securing body at least partly forms a housing of an electronic control unit; and
    wherein on the axial lower face the securing body, a contact surface for a damping element is provided for vibratingly coupling the securing body to the steering wheel main in body; and
    wherein the securing body is a damped steering wheel plate that couples to the airbag module.

2. The coupling device according to claim 1, wherein the electronic control unit comprises an equipped printed circuit board and a housing part, the housing part being attached to the securing body and, together with the securing body, enclosing the printed circuit board.

3. The coupling device according to claim 1, wherein plural engagement elements are provided and a damping element is associated with each engagement element, wherein the engagement elements and the associated damping element are disposed axially one behind the other.

4. The coupling device according to claim 1, wherein, on the axial upper face of the securing body, a horn contact or an actuating element for triggering a horn signal is disposed and the engagement element is designed so that the airbag module can be coupled to the securing body by the engagement connection in such a manner that it can be limitedly axially displaced.

5. The coupling device according to claim 1, wherein the securing body is a securing plate which extends substantially perpendicularly to the steering wheel axis and includes plural engagement elements.

6. The coupling device according to claim 5, wherein the electronic control unit comprises an equipped printed circuit board and a housing part, the housing part being attached to the securing body and, together with the securing body, enclosing the printed circuit board.

7. The coupling device according to claim 6, wherein plural engagement elements are provided and a damping element is associated with each engagement element, wherein the engagement elements and the associated damping element are disposed axially one behind the other.

8. The coupling device according to claim 7, wherein, on the axial upper face of the securing body, a horn contact or an actuating element for triggering a horn signal is disposed and the engagement element is designed so that the airbag module can be coupled to the securing body by the engagement connection in such a manner that it can be limitedly axially displaced.

9. The coupling device according to claim 8, wherein on the axial lower face of the securing body, a contact surface for a damping element is provided for vibratingly coupling the securing body to the steering wheel main body.

10. The coupling device according to claim 9, wherein the coupling device includes a damping element which abuts against the contact surface on the axial lower face of the securing body and vibratingly couples the securing body to the steering wheel main body so that the securing body and the steering wheel main body are movable relative to each other at least transversely to the steering wheel axis.

11. The coupling device according to claim 9, wherein the damping element is preassembled to the axial lower face of the securing body.

12. The coupling device according to claim 1, wherein the coupling device includes a damping element which abuts against the contact surface on the axial lower face of the securing body and vibratingly couples the securing body to the steering wheel main body so that the securing body and the steering wheel main body are movable relative to each other at least transversely to the steering wheel axis.

13. The coupling device according to claim 12, wherein the damping element is preassembled to the axial lower face of the securing body.

14. The coupling device according to claim 12, wherein the electronic control unit includes a horn contact.

15. The coupling device according to claim 1, wherein the electronic control unit includes a horn contact.

16. The coupling device according to claim 15, wherein the horn contact extends through the housing of the electronic control unit the horn contact being axially adjacent to a mating contact of the airbag module when the vehicle steering wheel is assembled.

17. A vehicle steering wheel of a vehicle, comprising
a steering wheel main body,
a prefabricated airbag module,
a coupling device according to claim 1, and
a damping element for vibratory coupling of the securing body to the steering wheel main body,
wherein the vehicle steering wheel includes a horn contact as well as a mating contact axially adjacent to the horn contact, and
wherein both the horn contact and the mating contact are formed on vibratingly supported components of the vehicle steering wheel.

18. The vehicle steering wheel according to claim 17, wherein the airbag module is secured to the steering wheel main body exclusively by the engagement connection with the coupling device.

19. The vehicle steering wheel according to claim 17, wherein the airbag module is secured to the steering wheel main body by the coupling device, wherein additionally a further connection between the airbag module and the steering wheel main body which is independent of the coupling device is provided.

* * * * *